United States Patent [19]
Lewis

[11] Patent Number: 5,307,140
[45] Date of Patent: Apr. 26, 1994

[54] OPTICAL TIME DOMAIN REFLECTOMETER WITH IMPROVED SIDELOBE SUPPRESSION

[75] Inventor: Meirion F. Lewis, Malvern, England

[73] Assignee: The Secretary of State for Defence in Her Britannic Majesty's Government of the United Kingdom of Great Britain and Northern Ireland, London, England

[21] Appl. No.: 862,756

[22] PCT Filed: Dec. 21, 1990

[86] PCT No.: PCT/GB90/02007
 § 371 Date: Jun. 24, 1992
 § 102(e) Date: Jun. 24, 1992

[87] PCT Pub. No.: WO91/10121
 PCT Pub. Date: Jul. 11, 1991

[30] Foreign Application Priority Data
 Dec. 28, 1989 [GB] United Kingdom ............... 8929258

[51] Int. Cl.$^5$ ............................................. G01N 21/88
[52] U.S. Cl. ................................................... 356/73.1
[58] Field of Search ....................................... 356/73.1

[56] References Cited

FOREIGN PATENT DOCUMENTS 273119 11/1989 German Democratic Rep. ..................................... 356/73.1

OTHER PUBLICATIONS

Patent Abstracts of Japan, vol. 6, No. 217 (P-152) (1095), Oct. 30, 1982, & JP, A 57120836 (Nippon Denshin Denwa Kosha) Jul. 28, 1982.
Journal of Lightwave Technology, vol. 7, No. 8, Aug. 1989, IEEE, (New York USA) M. Tateda et al: "Advances in Optical Time-Domain Reflectometry" (Con't) pp. 1217-1224.
International Search Report.

*Primary Examiner*—Vincent P. McGraw
*Attorney, Agent, or Firm*—Nixon & Vanderhye

[57] ABSTRACT

An optical time domain reflectometer incorporates a pulse expander (16) arranged to frequency disperse short duration pulses (14) from a pulse generator (12). The pulse expander (16) is a surface acoustic wave (SAW) filter. The frequency dispersed pulses (18) have long duration, and when amplified are employed to modulate the optical output of a laser diode (24). The optical output is fed to an optical fibre (32) for conventional time domain reflectometry measurements, and return signals are detected conventionally. The detected signals are transformed to short pulses (52) by a second SAW filter arranged as a pulse compressor (36).

8 Claims, 3 Drawing Sheets

OPTICAL TIME DOMAIN REFLECTOMETER WITH IMPROVED SIDELOBE SUPPRESSION

BACKGROUND OF THE INVENTION

1. Field of the Invention

This invention relates to an optical time domain reflectometer

2. Discussion of Prior Art

An optical time domain reflectometer is a known and commercially available device for determining the transmission properties of optical fibres. The device employs short laser pulses applied to a fibre input, and light returned to that input by reflection or backscattering within the fibre is analysed. Reflection occurs at fibre splices and major flaws such as cracks. Rayleigh scattering occurs due to microscopic flaws and refractive index changes in the fibre. Major flaws give rise to substantial reflections producing peaks in the return signal displayed as a function of time. The position of such a flaw is given by:

$$d = ct/2n \qquad (1)$$

where $d$ = distance along fibre from input
$c$ = velocity of light in vacuo
$n$ = fibre core effective refractive index (typically 1.5)
$t$ = optical pulse time of flight The factor of 2 in Equation (1) appears because the optical pulse covers the distance from fibre input to flaw and returns to the input before detection.

For any optical time domain reflectometer device, there is a fundamental limit to the length of optical fibre which may be investigated. This limit is set by the point at which the return signal becomes dominated by noise. The return signal becomes steadily weaker as the pulse time of flight and length of fibre increase due to the cumulative effects of absorption, reflection and scattering. A typical attenuation per unit length in a good quality optical fibre is 1 dB/km. Since an optical time domain reflectometer employs a double transit of a fibre, it will detect 2 dB/km attenuation in a good quality, splice-free fibre. As the fibre length increases to that required for long-haul communications, the attenuation becomes too severe for time domain measurement purposes.

In order to increase the length of optical fibre over which time domain measurements may be made, the laser pulse power may be increased. This is however undesirable because it increases the laser cost. Moreover, the input end of a fibre is a major source of reflection, and this may cause safety problems if high pulse powers are used. A further consideration is that power absorbed within a fibre at a flaw may damage the fibre, or may cause optical nonlinearity and measurement error. Alternatively, the pulse power may be kept constant and the pulse length (time duration) may be increased. This increases the energy in the pulse and the signal to noise ratio. However, it reduces the distance resolution (accuracy) for flaw detection in direct proportion to increase in pulse length. For example, with constant pulse intensity, increasing the duration of a pulse from 1 nanosecond to 1 microsecond increases the pulse energy and signal to noise ratio one thousandfold. However, a 1 nanosecond pulse has a physical length of 30 cm in free space and 20 cm in an optical fibre having a core refractive index of 1.5. Such a pulse will allow flaw position location to ±50 cm. For a 1 microsecond pulse, equivalent location accuracy is ±50 m. This implies that 100 meters of optical fibre would require physical inspection to locate a fault detected using a one microsecond pulse. Furthermore, multiple defects which are within 100 meters of one another would be unresolved.

Digital pulse correlation techniques have been used in attempts to overcome the foregoing problems. Examples of such techniques are described by K. Okada, K. Hashimoto, T. Shibata and Y. Nagaki in Electronics Letters, Jul. 31, 1980, Vol. 16, No. 16, pages 629–630 and by P. Healey in Proceedings 7th European Conference on Optical Communications, Copenhagen, 1981 pages 5.2. These techniques suffer several disadvantages. Firstly, in order to carry out correlation, two pulses are required. A received pulse must be synchronised with a delayed transmitted reference pulse waveform at the correlator. Testing over a range of pulse times of flight requires a series of correlations of return pulses with transmitted pulse waveforms with stepped delays. For example, in the case of a reflectometer with a resolution of 10 m and a fiber under test which is 20 km long, then 2000 correlations would be necessary to test the fibre length. Thus testing may take a relatively long time. Indeed in order to achieve an adequate signal to noise ratio it is usually necessary to integrate over a relatively large number of pulses at each distance, thus further increasing the measurement time.

A second disadvantage of digital correlation techniques is the limited pulse bandwidth over which they can operate. This is a result of the speed at which the device may be clocked (e.g. 4 MHz) and it limits the spatial resolution obtainable. Thirdly the degree to which sidelobes of the pulse autocorrelation function may be suppressed is also limited. This results in inability to distinguish true but weak signals from sidelobe effects. Finally, correlators are bulky resulting in relatively large devices.

More recently M. Nazarathy, S. A. Newton, R. P. Giffard, D. S. Moberly, F. Sischka, W. R. Trutna and S. Foster in Journal of Lightwave Technology, January 1989, Vol. 7, No. 1, pages 24–37 described a much improved digital correlation technique. This technique employs a pair of transmitted signals with complementary autocorrelation properties, which substantially eliminates the problem of suppressing sidelobes of the autocorrelation function. Other improvements over early digital correlation techniques have reduced measurement times. However the limitation on pulse bandwidth still applies with typical values being of the order of 4–10 MHz.

Commercial devices employing the technique described by M. Nazarathy et al are now available. A typical accuracy of such a device is ±8 m for a 125 ns pulsewidth. The measurement time required to obtain these results is, however, not publicly available. An accuracy of ±8 m, however, will require 16 m of fibre to be replaced to repair a fault. In many practical circumstances such as when the fibre is submerged or subterranean this is far from ideal.

SUMMARY OF THE INVENTION

It is an object of the invention to provide an alternative form of optical time domain reflectometer.

The present invention provides an optical time domain reflectometer including:

(i) means (12, 16, 20, 24) for generating a light beam (26) modulated by a large bandwidth, frequency dispersed compressible pulse (18); and (ii) means (35) for detecting the light beam (26) and its pulse modulation;

characterised in that the reflectometer (10) also includes surface acoustic wave (SAW) pulse compressing filtering means (36) arranged to receive the pulse modulation from the detecting means (35) and to counteract its frequency dispersion to produce a compressed pulse (52), the filtering means (36) and the generating means (12, 16, 20, 24) being arranged in combination to provide for sidelobe suppression in the compressed pulse.

The invention provides the advantage of providing resolution comparable with prior art digital correlation techniques without the complications of multiple reference and transmission pulses. It does not require apparatus to generate a series of relatively delayed reference pulses. Furthermore, it is not subject to bandwidth restrictions imposed by clock frequency limitations, and is capable of implementing pulse bandwidths of hundreds of MHz. In this form it out performs prior art devices while employing simpler apparatus.

The light beam generating means may include a pulse generator and pulse expanding SAW filtering means having frequency dispersion characteristics inverse to those of the pulse compressing SAW filtering means. At least one of these means may be arranged to provide for sidelobe suppression in the compressed pulse.

The pulse expanding and pulse compressing SAW filtering means may be non-linearly chirped devices providing in combination for sidelobe suppression. One, or both, of the pulse expanding and pulse compressing SAW filtering means may incorporate apodization to provide for sidelobe suppression. The light beam generating means may be arranged to produce a pulse bandwidth greater than 20 MHz.

BRIEF DESCRIPTION OF THE DRAWINGS

In order that the invention might be more fully understood, an embodiment thereof will now be described, by way of example only, with reference to the accompanying drawings, in which.

DETAILED DESCRIPTION OF PREFERRED EMBODIMENTS

Figure 1:
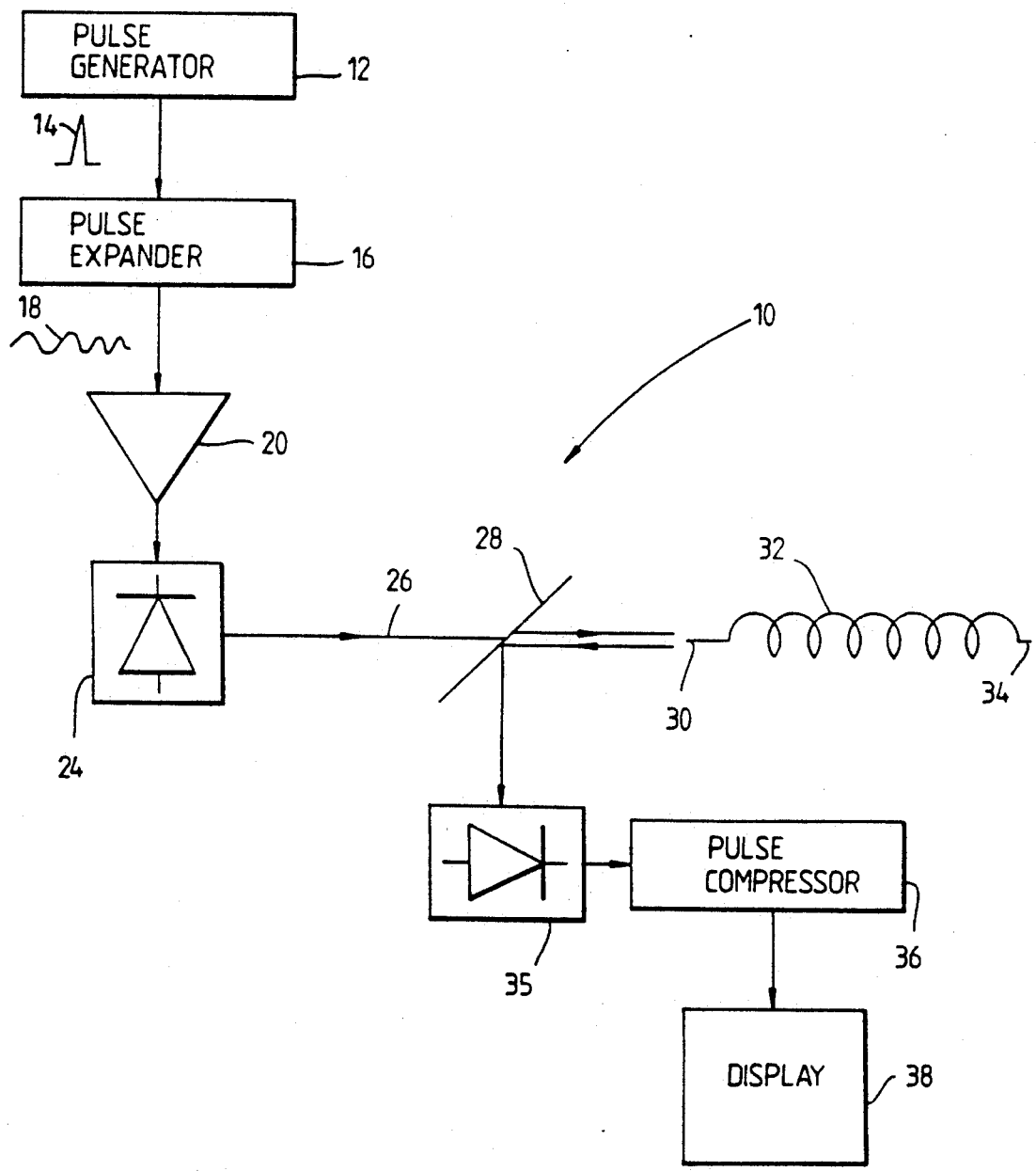
FIG. 1 is a schematic block diagram of an optical time domain reflectometer of the invention.

Referring to FIG. 1, an optical time domain reflectometer 10 of the invention is shown schematically in block diagram form. The reflectometer 10 incorporates an electrical pulse generator 12 arranged to supply short pulses 10 nanoseconds in duration and indicated by 14. Output from the generator 12 passes to a pulse expander 16 to be described later in more detail and providing a time delay which increases with increasing frequency. The pulse expander output is a "chirped" pulse as indicated at 18 (not shown to scale); i.e. it has a monotonically varying frequency. The pulse 18 is shown with its left hand edge leading, as would be displayed on an oscilloscope. It has a time duration of 10 microseconds, one thousand times longer than that of the pulse generator output. The chirped pulse 18 is fed to a power amplifier 20 arranged to provide a chirp-modulated DC bias supply to a laser diode 24.

The power amplifier 20 is arranged so that its DC output remains above a threshold level required to produce optical output from the laser diode 24. The average amplifier output is therefore equal to at least the sum of this threshold level and half the peak to peak chirp signal excursion after amplification. When operating above threshold, the laser diode output is a linear function of bias current. It is consequently intensity modulated in accordance with the chirp waveform 18.

The laser diode light output passes along a path 26 to a beam splitter 28, where it is partially transmitted to an input end 30 of an optical fibre 32. The fibre 32 has a remote output end 34. Light back-scattered or reflected within the fibre 32 returns to the beam splitter 28, where it is partially reflected to a photodiode detector 35. Biasing circuitry for the detector 35 is well known and is not illustrated. The detector output (which may be amplified if required) passes via a pulse compressor 36 to a display 38. As will be described later in more detail, the pulse compressor 36 provides a time delay which reduces with increasing frequency. It consequently compresses an up-chirp waveform to a much shorter pulse similar to that produced by the generator 12.

Figure 2:
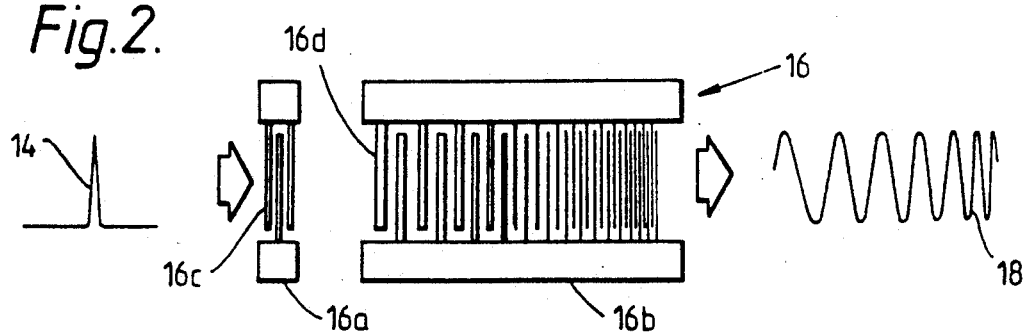
FIGS. 2 and 3 illustrate SAW filters incorporated in the FIG. 1 reflectometer.
Figure 3:
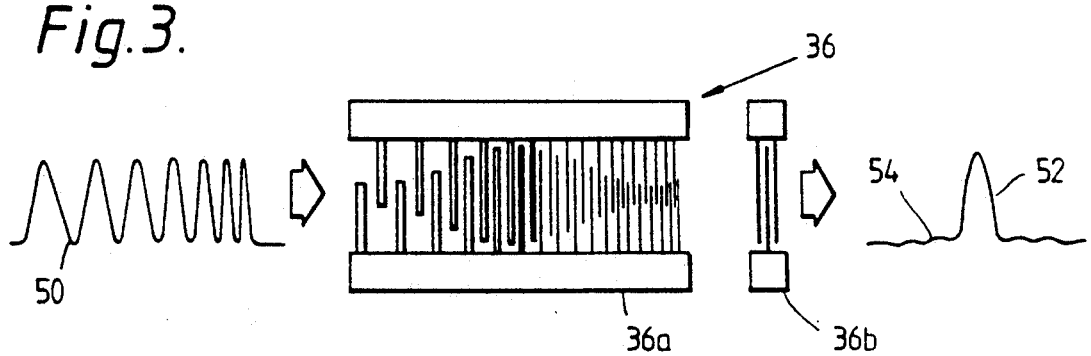

Referring now also to FIGS. 2 and 3, in which parts described earlier are like referenced, these drawings illustrate in more detail aspects of the pulse expander 16 and pulse compressor 36. The pulse expander and compressor 16 and 36 are surface acoustic wave (SAW) devices with interdigital transducers, and FIGS. 2 and 3 show electrode patterns formed on respective piezoelectric substrates (not shown). The pulse expander 16 comprises an input transducer 16a and an output transducer 16b, both transducers being of the interdigital finger variety. The input transducer 16a is relatively short, and has equal length fingers such as 16c with constant spacing and width. The output transducer 16b has equal length fingers such as 16d, but finger width and spacing are arranged such that the periodicity reduces linearly from finger to finger to the right along the transducer. In operation, a fast electrical pulse 14 is applied to the input transducer 16a. The pulse 14 contains a range of frequencies and gives rise to an acoustic pulse in the transducer substrate. The output transducer 16b varies in spatial frequency, which increases to the right. The output transducer therefore has a frequency sensitivity which varies along its length, and provides frequency dispersion. Progressively higher frequencies in the acoustic pulse excite the output transducer 16b progressively further to the right along the transducer. This results in the output transducer 16b responding to the acoustic pulse by generating an up-chirp electrical output pulse 18 (left hand leading edge) in which delay increases with increasing frequency. As has been said, the output pulse 18 has one thousand times the duration of the input pulse 14.

The pulse compressor 36 incorporates input and output transducers 36a and 36b similar to the output and input transducers 16b and 16a respectively; i.e. the order is relatively reversed. There is a further difference in that input transducer 36a has weighted finger overlap. Overlap varies from a central maximum value to lower values at either end. Input of a linearly chirped pulse 50 with a low frequency leading edge (left edge) results in output of a much shorter pulse 52.

This is because the transducers 36a and 36b provide delay which reduces with increasing frequency. The delay consequently reduces along the input pulse 50. The weighted finger overlap is arranged in a known manner to produce a high degree of sidelobe cancellation in the output pulse 52. This output pulse does exhibit sidelobes such as 54, but they are very low amplitude and may be neglected.

The reflectometer 10 illustrated in FIGS. 1, 2 and 3 operates as follows. Light from the laser diode 24 is intensity modulated by the expanded or chirped pulse 18, and passes via the beam splitter 28 into the fibre 32. Reflection occurs at the fibre input 30 and at the fibre output 34. Scattering occurs at defects in the fibre such as microscopic flaws, and reflections also occur at internal discontinuities such as fibre splices.

Each scattering or reflecting location in the fibre 32 receives the comparatively long frequency dispersed pulse modulation of the optical output of the laser diode 24. Each such location partly transmits this received optical signal onwards along the fibre 32 and partly reflects it towards the fibre input end 30. This gives rise to an output from the input end 30 which is detected by the photodiode 35. The electrical output from the photodiode 35 therefore comprises frequency dispersed pulses arising from optical reflection and scattering within the fibre 32. Return signals from nearby scattering or reflecting regions overlap in time. When these return signals pass through the pulse compressor 36, the latter applies a frequency selective delay reducing with increasing frequency. This reduces the long pulse waveform 50 from each scattering or reflecting region of the fibre 32 to a very much shorter pulse. The signal to noise ratio of the device 10 is governed by the length of the frequency dispersed pulse 50 (as will be described later), whereas the distance resolution is governed by the length of the compressed pulse 52. As will be described later in more detail, an improvement over the prior art is obtained which depends inter alia on the ratio of the lengths of the pulses 50 and 52; this improvement is as compared to a device lacking the pulse expander 15, pulse compressor 36 and amplifier 20, but otherwise as shown in FIG. 1.

Figure 4:
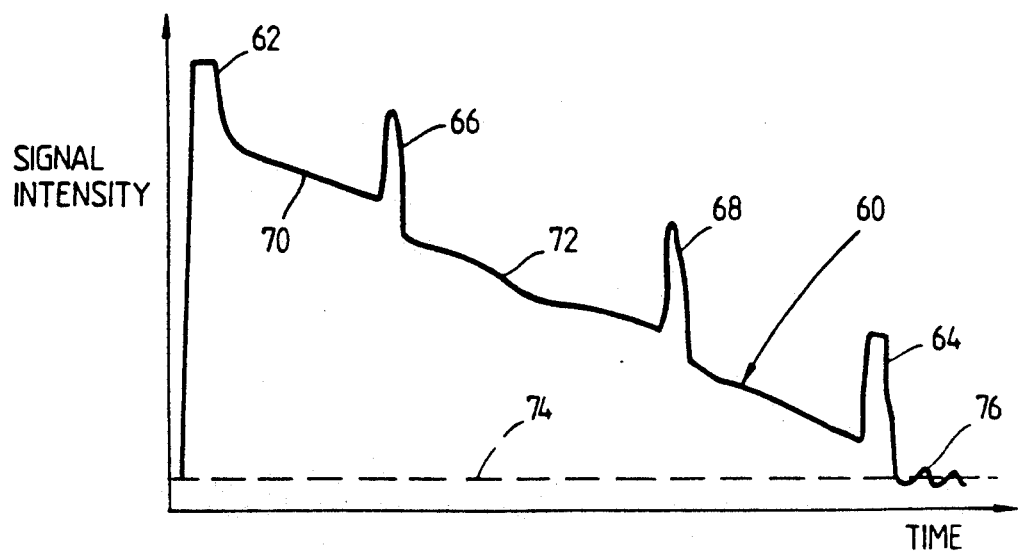
FIG. 4 is a graph illustrating return signal amplitude against time for an optical fibre coupled to a reflectometer.

FIG. 4 illustrates the variation of return signal intensity with time for a typical optical fibre under investigation by an optical time domain reflectometer. This drawing provides a graph 60 having initial and final peaks 62 and 64 and intermediate peaks 66 and 68. The peaks 62 and 64 correspond to reflections at the fibre ends 30 and 34 respectively. Peaks 66 and 68 represent reflections at fibre splices or substantial flaws such as cracks. A straight but inclined section 70 between peaks 62 and 66 indicates a fibre region where the optical scattering per unit length is constant. In contrast, an undulating region 72 indicates variation in scattering along a region of the fibre 32. A chain line 74 indicates the system noise level, and the graph 60 terminates in noise 76 beyond the fibre end reflection peak 64.

The graph 60 is drawn on the assumption that the fibre 32 is not of so great a length that the return signal amplitude falls below the system noise level 76 before a time corresponding to the fibre end 34 is reached.

In order to maximise the signal to noise ratio of the reflectometer 10, the laser diode 24 is pulsed on as hard as is practicable when in operation, and may be run just below its damage threshold. If the peak output intensity from the laser diode 24 is designated I, then the energy in a laser output pulse of duration t is proportional to It. When such a pulse is detected at 35, it gives rise to an output current pulse with electrical energy proportional to $I^2t$. This is because the output current from the detector 35 is proportional to optical intensity.

Let the durations of the short and chirped pulses 14 and 18 in FIGS. 1 and 2 be $t_{14}$ and $t_{18}$ respectively. The chirped pulse 18 gives rise to an electrical pulse energy proportional to $I^2t_{18}$ at the output of the detector 35. If the short pulse 14 were to be used without pulse expansion at 16 to modulate the laser 24 with pulse amplitude adjustment to provide like peak optical intensity I, then the electrical pulse energy at the detector output would be proportional to $I^2t_{14}$. However, the factors of proportionality differ in the short and chirped pulse cases; their ratio is designated k. This is because the electrical output pulse energy from the detector 35 depends on root mean square (rms) current modulation rather than the peak-to-peak value. The value of k is a function of pulse shape and receiver bandwidth, but is likely to be less than or equal to 8.

The receiver noise level is the same for both pulses because they have like bandwidth, one being derived from the other. Consequently the signal-to-noise enhancement $E_{SN}$ is given by:

$$E_{SN} = I^2 t_{18}/kI^2 t_{14} = t_{18}/kt_{14} \qquad (2)$$

In the foregoing example, $t_{18} = 10$ microseconds and $t_{14} = 10$ nanoseconds. With k less than or equal to 8, $E_{SN}$ is greater than or equal to 125.

It is implicit in the above analysis that the expanded pulse output from the detector 35 be compressible to a pulse 52 having substantially the same duration as the original pulse 14. This requires the chirped waveform 18 to have a bandwidth B of about $1/t_{14}$, and is a consequence of the Uncertainty Principle. The waveform 18 then has a time-bandwidth product $Bt_{18}$ of approximately $t_{18}/t_{14}$, i.e. one thousand. More generally, $Bt_{18}$ should be at least ten, and may be ten thousand or more.

The reflectometer 10 described with reference to FIGS. 1 to 4 may be modified so that the power amplifier 20 receives input either from the pulse expander 16 or directly from the pulse generator 12 as selected via a two-position switch (not shown). The gain of the amplifier 20 is also switchable to ensure that the laser diode output has like peak-to-peak excursions in both cases. A two-way switch is employed to route signals from the photodiode 35 either to the pulse compressor 36 or directly to the display 38. This allows the reflector 10 to be used with either short or long pulses at low or high signal to noise ratio respectively. It also overcomes a potential difficulty arising from a possible need to avoid simultaneous output from and reception by a reflectometer. This might be necessary if it were possible to overload the detection system (photodiode 35 etc) by virtue of leakage from the output system (elements 12 to 24). If so, it would be desirable to isolate or deactivate the detection system during output. This would cause a dead time of at least 10 microseconds ($t_{18}$), and an inability to make measurements over at least the first 1000 meters of an optical fibre. Switching to a 10 nanosecond pulse 14 allows measurements over short fibre lengths where enhanced signal to noise ratios are not needed.

In an alternative embodiment of the invention, the modulating pulse waveform 18 is generated digitally. It may be generated from digital circuitry, or alternatively be stored in a read only memory (ROM) and clocked out. Both these techniques are known in the art of digital electronics and will not be described further.

The waveform of the pulse 18 in FIG. 2 has constant amplitude, and its "instantaneous frequency" (defined as rate of change of phase) increases linearly with time. It is accordingly referred to as a linear up-chirp waveform. In similar terminology, the pulse compressor 36 of FIG. 3 is a linear down-chirp filter; i.e., it has frequency dispersion characteristics which are opposite to those of the pulse expander 16 (FIG. 2) giving rise to the waveform 18. In consequence, the combination of expander 16 and compressor 36 in series provides a non-dispersive broadband filter in which an input pulse 14 gives rise to a closely resembling output pulse 52. However, because of finite bandwidth limitations, the pulse 52 is not an exact reproduction of the pulse 14. In the absence of weighted finger overlap (apodization), the pulse compressor 36 would constitute a matched filter for the waveform 18, and signal to noise ratio would be maximised. However, in the absence of weighting, the strongest sidelobe 54 is only 13dB below the main peak 52. By including weighting in either one of or both of the transducers 16b and 36a, the sidelobes may be suppressed to about 35dB below the main peak 52. The consequent signal to noise ratio reduction is about 1dB, which is acceptable in practice. However, even this modest loss of 1dB may be substantially reduced by the use of a non-linear chirp waveform of appropriate kind. In such a waveform the rate of change of phase or instantaneous frequency is lower in mid-waveform than at each end. This provides a weighted spectrum, which removes the need to weight the pulse expander and/or compressor transducers 16b/36a. The non-linear chirp waveform is chosen such that the overall frequency response of an unweighted expander/compressor combination to which the waveform corresponds is the same as that of the combination of elements 16 and 36 in FIGS. 2 and 3. It then gives rise to a compressed pulse (equivalent to pulse 52) with sidelobes which are strongly suppressed without the need for a substantial degree of transducer weighting. It also provides a signal to noise ratio which is close to optimum, because such a compressor is very nearly a matched filter for the waveform.

Moreover, it provides a high degree of sidelobe suppression. The output compressed pulse produced in this way is the autocorrelation function of the original chirp waveform, and is related to its power spectrum through the Fourier Transform.

Figure 6:
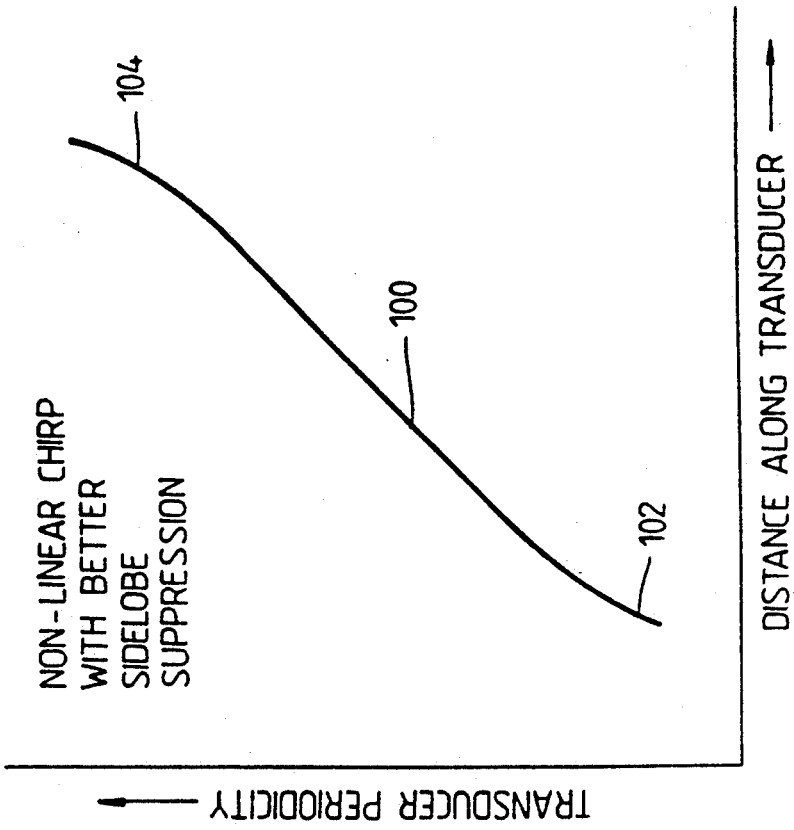
FIGS. 5 and 6 are graphs illustrating transducer periodicity variation in linear and non-linear chirped SAW filters respectively.
Figure 5:
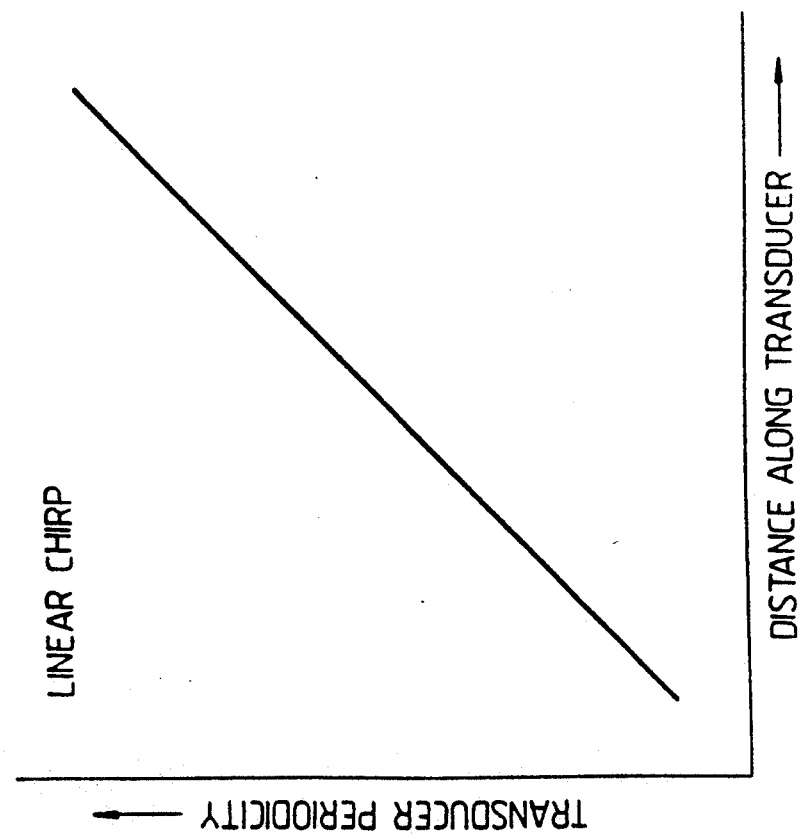

Referring now to FIGS. 5 and 6, these graphically illustrate the variation of transducer periodicity with distance along a transducer for linear and non-linear chirped transducers respectively. Transducer periodicity is the inverse of the spatial period of the transducer fingers. FIG. 5 illustrates the periodicity variation along the transducer 16b, which generates the linear up-chirp waveform 18. Periodicity increases linearly with distance. FIG. 6 illustrates the periodicity variation along a transducer which would generate a non-linear chirp waveform of appropriate kind to improve sidelobe suppression without apodization, as described above. It has a mid region 100 in which periodicity is linear with distance. However, it has end regions 102 and 104 in which periodicity increases more rapidly, (non-linearly). Transducer periodicity versus distance along a transducer is equivalent to "instantaneous frequency" versus time for pulses generated by supplying an impulse (delta function pulse) to the transducers. Therefore FIGS. 5 and 6 illustrate the frequency dispersion characteristics the transducers and the pulses generated by impulsing them.

As described with reference to FIGS. 2 and 3, the expander 16, or pulse 18, has opposite frequency dispersion characteristics to those of the compressor 36. Similarly each of FIGS. 5 and 6 indicates the periodicity characteristics of one of a respective pair of expander and compressor devices. The other of each pair has characteristics obtained by reversing the ordinate axis in a respective one of FIGS. 5 and 6.

The embodiment of FIG. 1 incorporates a beam splitter 28 to separate the outgoing and returning beams. Here intensity losses of at least 75% and corresponding reduction in signal to noise ratio are inevitable. It is possible to replace the element 28 by a polarising beamsplitter in series with a quarter wave plate, which then would provide a 90 degree rotation in plane of polarisation. In consequence, the outgoing beam would be transmitted by the polarising beamsplitter but the returning polarisation rotated beam would be reflected. This would provide highly efficient separation of the outgoing and returning beams provided that the optical fibre 32 introduced no substantial change in polarisation by intermode scattering. This proviso is difficult to satisfy, at least for multimode fibres.

The invention may employ an averaging technique for further improvement in signal to noise ratio. In this technique, the display 38 is arranged to sum the output of the pulse compressor 36 over a number of pulses. This increases signal/noise ratio in proportion to the square root of the number of pulses.

An alternative embodiment of the invention, not illustrated, may be constructed in which two identical linear up-chirp filters are employed. In this embodiment the modulation of the light beam is as previously described. However, the detected pulse modulation, in place of passing to a pulse compressor, passes to a local oscillator of higher frequency. Here the pulse undergoes subtraction from the local oscillator signal, which produces pulse frequency spectrum inversion. Frequency inversion techniques are well known and will not be described in detail. The frequency inverted signal is then passed to a SAW linear up-chirp filter identical to that used to generate the pulse modulation, and is compressed. Thus the combination of a local oscillator arranged for frequency inversion and a linear up-chirp SAW filter has frequency dispersion characteristics opposite to those of the linear up-chirp filter alone.

The alternative embodiment described above was constructed using two Signal Technology DS Series Dispersive Delay Lines DS1313, which have a nominal bandwidth of 500 MHz and show a compressed pulsewidth of about 5 ns. Each of these filters had a frequency band from 500 MHz to 1000 MHz, and a local oscillator (LO) frequency of 1500 MHz was employed. Subtraction of 500-1000 MHz from 1500 MHz produces 1000-500 MHz; i.e. the high low frequencies are exchanged. In consequence, a frequency dispersed pulse such as 18 in FIG. 2 in which low frequencies lead becomes converted by the LO to a pulse of like bandwidth and spectrum but with high frequencies leading. This latter pulse has inverse frequency dispersion characteristics to those of the pulse expanding SAW filter, and is therefore compressible in a like filter. This enables faults to be detected to within ±1 m. In a fully optimised system pulse width could theoretically be reduced to around 2 ns, thus enabling faults to be detected to within ±0.3 m.

Further embodiments of the invention, not illustrated, may be constructed in which a single SAW filtering device is employed for both pulse expansion and compression. The first of these employs a linearly chirped SAW filter, combined with frequency inversion for pulse compression, as described above. The second employs a SAW filter with three transducers arranged such that a pulse input at one end of the device is expanded whilst one input at the other end of the device is compressed. Such a SAW device may be constructed with a wide range of frequency dispersion characteristics. Clearly in these embodiments the expansion and compression of pulses must be separated in time, thus measurements may not be made on the length of the fibre adjacent to the fibre input. Therefore, if an entire fibre length is to be tested with a reflectometer according to either of these embodiments it must incorporate mode switching as described above in terms of a modification to the reflectometer 10.

The nominal bandwidth of 500 MHz for the DS1313 dispersive delay lines is typical of the bandwidths at which SAW devices are capable of achieving. Such a bandwidth provides a substantial advantage over digital techniques in which the bandwidth is limited by the clocking speed, e.g. 4 MHz. Since the spatial resolution achievable by an OTDR system is directly related to the bandwidth, SAW based systems have the capability of achieving higher spatial resolution than digital correlator based systems.

In general, the bandwidth of the optical pulse modulation employed in a reflectometer of the invention should be as large as possible. In practice, it will be restricted by the ability to produce short pulses 14 and to disperse them and subsequently compress them. However, the pulse modulation bandwidth should be at least 5 MHz and preferably at least 20 MHz. Moreover, as has been said it is possible to employ bandwidths greater than 100 MHz, e.g. several hundred MHz.

The SAW filters described so far have been chirped filters incorporating dispersive transducers. There are, however, many other forms of SAW filter which are suitable for use in OTDR's. In particular reflective array compressors (RAC's), which incorporate dispersive reflectors in place of dispersive transducers are suitable.

I claim:

1. An optical time domain reflectometer including:
   (i) generating means for generating a light beam modulated by a large bandwidth, frequency dispersed compressible pulse;
   (ii) detecting means for detecting the light beam and its pulse modulation: and
   (iii) a surface acoustic wave (SAW) pulse compressing filtering means for receiving the pulse modulation from the detecting means and for producing a compressed pulse, said filtering means and said generating means comprising in combination a means for providing sidelobe suppression in the compressed pulse.

2. A reflectometer according to claim 1 wherein the light beam generating means includes a pulse generator and SAW pulse expanding filtering means having frequency dispersion characteristics inverse to those of the SAW pulse compressing filtering means, at least one of said pulse expanding and said pulse compressing filtering means being arranged to comprising said means for providing sidelobe suppression in the compressed pulse.

3. A reflectometer according to claim 2 wherein the pulse expanding and pulse compressing SAW filtering means are non-linearly chirped devices and comprise in combination said means for providing sidelobe suppression.

4. A reflectometer according to claim 2 wherein at least one of the pulse expanding and pulse compressing SAW filtering means includes apodization for providing sidelobe suppression.

5. A reflectometer according to claim 1 wherein the light beam generating comprises a means for providing a pulse bandwidth greater than 20 MHz.

6. A reflectometer according to claim 1 further including a means for switching to a second mode of operation involving reduced duration pulse modulation of the light beam.

7. An optical time domain reflectometer including:
   (i) generating means for generating a light beam modulated by a large bandwidth, frequency dispersed compressible pulse;
   (ii) detecting means for detecting the light beam and its pulse modulation;
   (iii) inverting means for inverting the frequency spectrum of the detected pulse modulation; and
   (iv) surface acoustic wave (SAW) pulse compressing filtering means for receiving frequency inverted pulses from the inverting means, said generating means includes surface acoustic wave SAW pulse expanding means having filtering characteristics to said pulse compressing filtering means.

8. An optical time domain reflectometer including:
   (i) generating means for generating a light beam modulated by a large bandwidth, frequency dispersed compressible pulse;
   (ii) detecting means for detecting the light beam and its pulse modulation;
   (iii) inverting means for inverting the frequency spectrum of the detected pulse modulation; and
   (iv) pulse compressing filtering means for receiving frequency inverted pulses from the inverting means, said generating means and the pulse comprising filtering means are comprised of a single surface acoustic wave device having three transducers.

* * * * *

UNITED STATES PATENT AND TRADEMARK OFFICE
CERTIFICATE OF CORRECTION

PATENT NO. : 5,307,140
DATED : April 26, 1994
INVENTOR(S) : Meirion F. LEWIS

It is certified that error appears in the above-indentified patent and that said Letters Patent is hereby corrected as shown below:

Column 2, line 2, change "±50 cm" to --±5 cm--.

Column 10, line 11, delete "being arranged to";

line 41, after "characteristics" insert --similar--.

Signed and Sealed this

Thirteenth Day of September, 1994

Attest:

BRUCE LEHMAN

Attesting Officer     Commissioner of Patents and Trademarks